United States Patent [19]
Verstegen et al.

[11] 3,839,219
[45] Oct. 1, 1974

[54] EUROPIUM ACTIVATED ALKALINE EARTH MAGNESIUM ALUMINIUM SILICATE LUMINESCENT MATERIAL

[75] Inventors: Judicus Marinus Pieter Jan Verstegen; Willem Lambertus Wanmaker; Johannus Godefridus Verlijsdonk, all of Emmasingel, Netherlands

[73] Assignee: U.S. Philips Corporation, New York, N.Y.

[22] Filed: Oct. 2, 1972

[21] Appl. No.: 293,791

[30] Foreign Application Priority Data
Oct. 7, 1971    Netherlands.................... 7113747

[52] U.S. Cl.......................................... 252/301.4 F
[51] Int. Cl................................................ C09k 1/54
[58] Field of Search.......................... 252/301.4 F

[56] References Cited
UNITED STATES PATENTS
| | | | |
|---|---|---|---|
| 3,544,481 | 12/1970 | Barry............................ | 252/301.4 F |
| 3,676,361 | 7/1972 | Datta............................ | 252/301.4 F |

FOREIGN PATENTS OR APPLICATIONS
| | | | |
|---|---|---|---|
| 2,028,376 | 12/1970 | Germany..................... | 252/301.4 F |

OTHER PUBLICATIONS
Laud et al., "J. Electrochem Soc.," Vol. 118, No. 6, p. 918–923.

Isaacs, "J. Electrochem Soc.," Vol. 118, No. 6, p. 1009–1011.

*Primary Examiner*—Jack Cooper
*Attorney, Agent, or Firm*—Frank R. Trifari; Norman N. Spain

[57] ABSTRACT

A luminescent silicate activated by bivalent europium which is defined by the formula

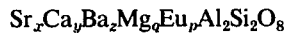

$$Sr_xCa_yBa_zMg_qEu_pAl_2Si_2O_8$$

in which
$x + y + z + q + p = 1$.
$0.05 \leq q \leq 0.70$
$0.001 \leq p \leq 0.50$
$p + q \leq 0.75$.

The silicate exhibits high luminescent flux and quantum efficiency when excited by ultraviolet radiation.

8 Claims, No Drawings

EUROPIUM ACTIVATED ALKALINE EARTH MAGNESIUM ALUMINIUM SILICATE LUMINESCENT MATERIAL

The invention relates to a luminescent screen provided with a luminescent silicate activated by bivalent europium. Furthermore the invention relates to mercury vapour discharge lamps and cathode-ray tubes provided with a luminescent screen of this kind and to the luminescent silicate itself.

Silicates activated by bivalent europium are known from the published German patent application No. 2,028,376 in which silicates the fundamental lattice can be defined by the formula $Sr_xCa_yBa_zAl_2Si_2O_8$ in which $x + y + z$ substantially has the value of 1. These alkaline earth aluminium silicates are known under the name of alkaline earth felspars and may have different crystal structures. Upon activation of these felspars by bivalent europium luminescent materials are obtained which upon excitation by ultraviolet radiation or by electrons have an emission with a spectral distribution of the emitted radiation whose maximum is located at wavelengths of between 370 and 440 nm, dependent on the nature of the alkaline earth metal used and on the crystal structure of the silicate.

The luminescent properties of these bivalent europium-activated felspars are likewise described in the recent publications in J. Electrochem. Soc. Vol. 118, No. 6, p. 918 – 923 and p. 1009 – 1011. These publications furthermore state particulars concerning the crystal structure of the relevant fundamental lattices. It has been found that calcium felspar can constitute a full series of solid solutions with strontium felspar. The stable phase of calcium felspar and/or strontium felspar has a triclinic crystal structure (calcium anorthite and strontium anorthite). Furthermore there are a number of metastable phases of these felspars. Barium felspar occurs, inter alia, in a very persistent metastable phase having the hexagonal crystal structure. This metastable phase is very difficult to convert into the stable crystal phase which has a monoclinic symmetry (celsian).

Investigations on the activation of the above-mentioned felspars by bivalent europium have shown that the highest luminous fluxes can be obtained when using the stable phases of these felspars as a fundamental lattice. As is the case with the manufacture of many silicate lattices, it is found that the manufacture of these stable phases is not simple. Notably for obtaining the stable monoclinic barium felspar phase repeated and long-time heat treatments at relatively high temperatures are required. As is known, a faster reaction in the manufacture of luminescent silicates can be obtained by using an excess of $SiO_2$ in the firing mixture. When used in discharge lamps the luminescent silicates manufactured in this way, however, often exhibit a large decline in the luminous flux during the lifetime of the lamps.

The object of the invention is to provide luminescent silicates activated by bivalent europium which, as compared with the above-mentioned known silicates, yield higher luminous fluxes and can be manufactured more easily.

A luminescent screen according to the invention is provided with a luminescent silicate activated by bivalent europium and is characterized in that the silicate is defined by the formula $Sr_xCa_yBa_zMg_qEu_pAl_2Si_2O_8$, in which $x + y + z + p + q = 1$
$0.05 \leq q \leq 0.70$
$0.0001 \leq p \leq 0.50$
$p + q \leq 0.75$ Experiments which have led to the invention have shown that a part of the alkaline earth metal in the alkaline earth felspars activated by bivalent europium can be replaced by magnesium. Luminescent materials are obtained whose quantum efficiency is higher than that of the known magnesium-free felspars so that higher luminous fluxes can be achieved upon excitation by ultraviolet radiation. The spectral distribution of the radiation emitted by the silicates according to the invention slightly deviates from that of the corresponding known silicates which do not contain magnesium. Also upon electron excitation high brightnesses can be achieved with the silicates according to the invention. In the case of barium felspar it has been found that partial replacement of barium by magnesium promotes the formation of the stable monoclinic crystal phase. As a result the manufacture of the stable barium felspar phase according to the invention does not present special difficulties.

The above-mentioned formula and conditions show that the sum of the number of alkaline earth metal atoms, magnesium atoms and europium atoms in the silicates according to the invention has the value of 1. When manufacturing the luminescent silicates it is, however, possible to deviate from this value 1 and admit values of $x + y + z + p + q$ of between, for example, 0.80 and 1.20. It is, however, assumed that the actual luminescent phase satisfies the stoichiometrical formula of the alkaline earth felspars in which a part of the alkaline earth metals is replaced by magnesium and europium. X-ray diffraction analyses of the products obtained from non-stoichiometrical firing mixtures show that the stoichiometrical phase is then also present. An excess of one or more of the composite constituents possibly to be used during manufacture remains present in addition to the luminescent phase and is generally found to have only a slight effect on the luminous flux. However, when using silicates manufactured with a relatively large excess of $SiO_2$ in lamps, a large decline in the luminous flux during the lifetime of the lamps is often found to occur.

The magnesium content $q$ of a luminescent silicate according to the invention is to be located between the values of 0.05 and 0.70. At values of $q$ of less than 0.05 an insufficient effect of the magnesium addition is obtained and at values of $q$ of more than 0.70 the luminous flux of the luminescent material obtained is found to be too low for practical uses as a result of the change then occurring in the crystal structure of the silicate.

The europium content $p$ of the luminescent silicates according to the invention is chosen between the limits 0.001 and 0.50. It has been found that relatively high europium concentrations (up to $p = 0.50$) can be admitted. For values of $p$ of more than 0.50 materials having slight luminous flux are, however, obtained as a result of concentration quenching. The location of the maximum of the spectral distribution of the emitted radiation is found to be influenced by the magnitude of the europium concentration, namely in the sense that higher values of $p$ result in a shift of the maximum to larger wavelengths. This is particularly advantageous because it creates the possibility of adapting the location of the maximum of the spectral distribution to the requirements imposed for a specific use by suitable choice of the europium concentration. The sum of the europium and magnesium contents $p + q$ in a luminescent material according to the invention must be not more than 0.75 because otherwise either a change in the crystal structure occurs or a luminous flux is obtained which is less suitable for practical uses.

In a preferred embodiment of a luminescent screen according to the invention a luminescent silicate is used which is defined by the above-mentioned formula and conditions, in which, however, the barium content $z$ is not more than 0.50. These luminescent silicates have the triclinic crystal structure of the strontium and/or calcium anorthites. They have a spectral distribution of the emitted radiation having a maximum located at approximately 400 – 460 nm and may be used in low-pressure mercury vapour discharge lamps (predominantly 254 nm. excitation) for use in photochemical processes. They can also be used in lamps of this kind for general illumination purposes, combined with other luminescent materials in which the luminescent silicates according to the invention serve to obtain a desired colour temperature of the radiation emitted by the lamp and/or for achieving a satisfactory colour rendition of the lamp.

The highest luminous fluxes are obtained with such strontium and/or calcium anorthites according to the invention if the magnesium content $q$ is chosen to be between the limits 0.10 and 0.50 and if the barium content $z$ is between 0.05 and 0.40. In fact, it has been found that a small quantity of barium has favourable influence on the quantum efficiency of these strontium and/or calcium anorthites.

Europium contents $p$ of between the values 0.02 and 0.15 for the strontium and/or calcium anorthites are preferred because then the highest luminous fluxes are obtained.

In a further preferred embodiment of a luminescent screen according to the invention a luminescent silicate is used for which $y + z + q$ is located between the limits 0.05 and 0.40. The main constituent of these silicates is strontium and they have the triclinic crystal structure of strontium anorthite. They have a very efficient emission in a comparatively narrow range at short wavelengths ($\lambda_{max}$ approximately 410 nm.). The europium content $p$ is to be chosen to be relatively low, namely between 0.005 and 0.05. Such a luminescent screen may be advantageously used in low-pressure mercury vapour discharge lamps for photocopy purposes.

A further embodiment of a luminescent screen according to the invention which is preferred comprises a luminescent silicate defined by the above-mentioned general formula and conditions in which, however, the value of the barium content $z$ is not less than 0.50. These luminescent silicates have the monoclinic crystal structure of barium felspar and have an efficient emission at a maximum located at 430 – 470 nm. A great advantage of the luminescent barium felspars according to the invention is that, as compared with the known barium felspars, they can be easily and reproducibly be manufactured while an excess of $SiO_2$ in the firing mixture can be omitted.

Barium felspars according to the invention are preferred for which the sum of the strontium and calcium contents $x + y$ is smaller than or equal to 0.25 because then very high quantum efficiencies are achieved. The magnesium content $q$ is preferably chosen to be between 0.05 and 0.40 because then the highest luminous fluxes can be obtained.

The europium content $p$ of the barium felspars according to the invention are preferably chosen to be between 0.02 and 0.15 because it has been found that then the most efficient luminescent materials are obtained.

In addition to the use, already stated, in low-pressure mercury vapour discharge lamps, the luminescent silicates according to the invention may also be used in high-pressure mercury vapour discharge lamps because these silicates can also be satisfactorily excited by ultraviolet radiation at a wavelength of 365 nm. In that case it is an advantage that the temperature dependence of the luminous flux of the silicates according to the invention, particularly that of the barium felspars, is favourable. Furthermore, the silicates according to the invention have a high brightness upon excitation by electrons, as will be proved hereinafter. As a result these silicates can be advantageously used in cathoderay tubes.

The invention will now be further described with reference to an example and a number of measurements.

EXAMPLE

A mixture is made of
3.394 g $BaCO_3$
0.169 g $MgCO_3$
1.998 g $Al_2O_3$
0.110 g $AlF_3·3H_2O$
2.403 g $SiO_2$
0.141 g $Eu_2O_3$ This mixture is heated three times and every time for one hour in a furnace at 1400°C in a weakly reducing atmosphere. This atmosphere is obtained, for example, by passing a nitrogen stream comprising a few percent of hydrogen into the furnace. After each heat treatment the product is ground and sieved. The luminescent material thus obtained is defined by the formula $Ba_{0.86}Mg_{0.10}Eu_{0.04}Al_2Si_2O_8$ and, as has been proved by X-ray diffraction analyses, it has the monoclinic crystal structure of barium felspar. Upon excitation by shortwave ultraviolet radiation (predominantly 254 nm) this material is found to have a quantum efficiency of 79 percent. The emission maximum of this material is located at 440 nm. Further results of measurements are mentioned in Table I under example 2.

Analogously as described in the above-mentioned example, a number of luminescent silicates have been manufactured for which the barium content $z$ is not less than 0.50 and all of which have the monoclinic crystal structure of barium felspar. Starting materials may be chosen to be oxides of the metals desired in the silicate or compounds which can produce these oxides. Silicon is generally added as silicon dioxide to the firing mixture. It is found to be advantageous to add a part of aluminium, for example, 2 percent as aluminium fluoride, because then the reaction speed is enhanced. The heating temperature may be chosen to be within wide limits, for example, between 1200° and 1500°C and, likewise as the firing time and the number of firing treatments to be carried out, it is dependent on the reactivity of the firing mixture.

The results of measurements on these felspars are summarized in Table I under examples 1 to 7. The Table not only states the value of the barium, magnesium and europium contents for each example, but also the luminous flux (LO) and the peak height (PH) of the emission band upon excitation by ultraviolet radiation at a wavelength of 254 nm. The value of luminous flux and peak height (both fixed at 100) of NBS 1027 (luminescent magnesium tungstate) has been used as a standard. The Table furthermore states the location of the emission maximum ($\lambda_{max}$) in the spectrum, the half-value width ($d_{1/2}$) of the emission band and the quantum efficiency (Q) upon excitation by radiation having a wavelength of 254 nm. Furthermore the Table states in column $T_{50}$ the temperature at which the luminous flux has decreased to 50 percent of the luminous flux at room temperature, and for some materials the brightness (H) upon electron excitation at an energy of 5 keV. The known cerium-activated calcium aluminium silicate (gehlenite) has been used as a standard whose brightness is fixed at 100. For the sake of comparison the Table includes under A the measurements performed on the known bivalent europium-activated barium felspar which does not comprise magnesium. The known felspar is manufactured analogously as described in the above-mentioned example in which, however, the firing mixture does not comprise magnesium. Furthermore it has been found that in the manufacture of the known barium felspar 7 firing treatments for 1 hour at 1400°C are required to obtain a complete reaction and the formation of the monoclinic phase. The Table clearly shows that the luminescent felspars according to the invention have a considerably higher quantum efficiency, a higher luminous flux and in many cases also a higher peak height than the known magnesium-free barium felspar.

Analogously as described in the above-mentioned example a number of luminescent silicates according to the invention have been prepared for which the barium content z is lower than 0.50 and all of which have the triclinic crystal structure of strontium anorthite and calcium anorthite as has been proved by X-ray diffraction analyses. Measurements on these anorthites have been summarized in Table II. The same standard as for the measurement of Table I have been used for the measurements performed at 254 nm excitation and upon electron excitation. For the sake of comparison Table II likewise includes the results of measurements on the known bivalent europium-activated magnesium-free strontium anorthite and calcium anorthite (example B and C, respectively).

TABLE II

| | | | | $Sr_xCa_yBa_zMg_qEu_pAl_2Si_2O_8$ | | | | | | | |
|---|---|---|---|---|---|---|---|---|---|---|---|
| Example | x | y | z | q | p | PH | LO | $\lambda_{max}$ in nm | $d\frac{1}{2}$ in nm | Q in % | H |
| B | 0.96 | 0 | 0 | 0 | 0.04 | 192 | 85 | 406 | 59 | 73 | |
| C | 0 | 0.96 | 0 | 0 | 0.04 | 139 | 80 | 431 | 70 | 71 | |
| 8 | 0.895 | 0 | 0 | 0.10 | 0.005 | 165 | 76 | 407 | 63 | 66 | 116 |
| 9 | 0.88 | 0 | 0 | 0.10 | 0.02 | 175 | 86 | 408 | 78 | 74 | |
| 10 | 0.84 | 0 | 0 | 0.10 | 0.06 | 138 | 95 | 415 | 94 | 75 | |
| 11 | 0.80 | 0 | 0 | 0.10 | 0.10 | 136 | 95 | 423 | 111 | 74 | |
| 12 | 0.70 | 0 | 0 | 0.10 | 0.20 | 95 | 95 | 454 | 132 | 73 | 170 |
| 13 a) | 0.73 | 0 | 0 | 0.23 | 0.04 | 170 | 95 | 412 | 79 | 80 | 189 |
| 14 a) | 0.50 | 0 | 0 | 0.46 | 0.04 | 132 | 85 | 413 | 94 | 71 | |
| 15 | 0 | 0.86 | 0 | 0.10 | 0.04 | 139 | 81 | 433 | 74 | 65 | 178 |
| 16 | 0 | 0.73 | 0 | 0.23 | 0.04 | 89 | 57 | 434 | 78 | 46 | |
| 17 a) | 0.43 | 0.43 | 0 | 0.10 | 0.04 | 164 | 94 | 422 | 78 | 74 | |
| 18 a) | 0.33 | 0.33 | 0 | 0.30 | 0.04 | 125 | 74 | 422 | 80 | 59 | |
| 19 a) | 0.33 | 0 | 0.33 | 0.30 | 0.04 | 150 | 102 | 437 | 102 | 82 | |
| 20 | 0.66 | 0.10 | 0.10 | 0.10 | 0.04 | 172 | 97 | 412 | 82 | 80 | |
| 21 | 0.38 | 0 | 0.38 | 0.20 | 0.04 | 145 | 104 | 438 | 103 | 82 | | a) twice fired for 1 hour at 1400°C

It is to be noted that a small part of aluminium, for example, up to 10 percent may be replaced by boron in the luminescent silicates according to the invention. Such a replacement has little influence on the luminescent properties of the silicate and does not provide extra advantages.

What is claimed is:

1. A luminescent silicate activated by bivalent europium, defined by the formula:

$$Sr_xCa_yBa_zMg_qEu_pAl_2Si_2O_8$$

in which
$x + y + z + q + p = 1$
$0.05 \leq q \leq 0.70$
$0.001 \leq p \leq 0.50$
$p + q \leq 0.75$

TABLE I

| | | | $Ba_zMg_qEu_pAl_2Si_2O_8$ | | | | | | |
|---|---|---|---|---|---|---|---|---|---|
| Example | z | q | p | LO | PH | $\lambda_{max}$ in nm | $d\frac{1}{2}$ in nm | Q in % | $T_{50}$ in °C | H |
| A a) | 0.96 | 0 | 0.04 | 76 | 127 | 441 | 87 | 62 | >500 | |
| 1 b) | 0.91 | 0.05 | 0.04 | 103 | 148 | 445 | 98 | 80 | 455 | |
| 2 | 0.86 | 0.10 | 0.04 | 104 | 170 | 440 | 90 | 79 | 490 | |
| 3 | 0.73 | 0.23 | 0.04 | 102 | 151 | 443 | 96 | 73 | >500 | 165 |
| 4 | 0.50 | 0.46 | 0.04 | 87 | 125 | 442 | 96 | 76 | 490 | |
| 5 | 0.895 | 0.10 | 0.005 | 79 | 139 | 438 | 92 | 76 | >500 | 69 |
| 6 | 0.84 | 0.10 | 0.06 | 106 | 157 | 444 | 95 | 81 | 475 | |
| 7 | 0.70 | 0.10 | 0.20 | 103 | 125 | 459 | 108 | 79 | 375 | 175 | a) 7 times fired for 1 hour at 1400°C
b) 4 times fired for 1 hour at 1400°C and having a higher luminous flux, when excited by ultraviolet radiation, than said silicate without Mg.

2. The luminescent silicate of claim 1 wherein
$0 \leq z \leq 0.50$.

3. The luminescent silicate of claim 2 wherein
$0.10 \leq q \leq 0.50$ and
$0.05 \leq z \leq 0.40$.

4. The luminescent silicate of claim 3 wherein
$0.02 \leq p \leq 0.15$.

5. The luminescent silicate of claim 3 wherein
$0.05 \leq y + z + q \leq 0.40$ and
$0.005 \leq p \leq 0.05$.

6. The luminescent silicate of claim 1 wherein
$Z \geq 0.50$.

7. The luminescent silicate of claim 6 wherein
$x + y \leq 0.25$ and
$0.05 \leq q \leq 0.40$.

8. The luminescent silicate of claim 7 wherein
$0.02 \leq p \leq 0.15$.

* * * * *